United States Patent [19]

Ehrhart et al.

[11] Patent Number: 5,003,026

[45] Date of Patent: Mar. 26, 1991

[54] UV CURABLE NO-WAX COATING

[75] Inventors: Wendell A. Ehrhart, Red Lion; David A. Smith, York, both of Pa.

[73] Assignee: Armstrong World Industries, Inc., Lancaster, Pa.

[21] Appl. No.: 369,866

[22] Filed: Jun. 22, 1989

[51] Int. Cl.$^5$ ............................................. C08G 18/67
[52] U.S. Cl. .................................................. 528/49
[58] Field of Search ........................................ 528/49

[56] References Cited

U.S. PATENT DOCUMENTS

| | | | |
|---|---|---|---|
| 3,924,023 | 12/1975 | Boranian et al. | 427/54 |
| 3,935,364 | 1/1976 | Proksch et al. | 428/304 |
| 3,959,521 | 5/1976 | Suetsugi et al. | 427/44 |
| 4,016,306 | 4/1977 | Miyagawa et al. | 427/54 |
| 4,075,366 | 2/1978 | Packer et al. | 427/44 |
| 4,138,299 | 2/1979 | Bolgiano | 204/159 |
| 4,421,782 | 12/1983 | Bolgiano et al. | 427/53.1 |

Primary Examiner—Maurice J. Welsh

[57] ABSTRACT

Gloss retention and stain resistance are improved in a no-wax UV cured flooring wear surface by reacting a phthalate polyester polyol and a long chain hydroxy acrylate with an aromatic or cycloalkyl diisocyanate to form an oligomer which is employed as a major ingredient of the UV curable coating composition used to produce the wear surface.

20 Claims, No Drawings 5,003,026

UV CURABLE NO-WAX COATING

FIELD OF THE INVENTION

The invention relates to UV curable coatings useful as wear surfaces for resilient floor coverings. More particularly, the invention relates to a UV cured wear surface which provides improved gloss and stain protection for floor coverings.

BACKGROUND OF THE INVENTION

Urethane acrylates are known as radiation cured wear layers for flexible surface coverings, e.g. floor tile and sheet flooring. Products and processes using UV curing are described in U.S. Pat. Nos. 3,924,023; 3,935,364; 3,959,521; 4,016,306; 4,075,366; 4,421,782; and 4,138,299.

A wear surface composition, comprising a UV curable, polyester based, urethane acrylate/reactive diluent composition, overcoated (wet-on-wet) with an acrylic acid/water solution containing surfactant during UV curing, is described in U.S. Pat. No. 4,421,782. The present invention provides an improvement over the base compositions of U.S. Pat. No. 4,421,782 in terms of gloss retention and stain resistance, without requiring the cumbersome wet-on-wet process.

SUMMARY OF THE INVENTION

An improved UV curable coating for a floor covering comprises:
(1) an oligomer comprising the reaction product of a phthalate polyester polyol, an aromatic or cycloalkyl diisocyanate and a monohydroxymonoacrylate with a molecular weight of between about 250 to about 600;
(2) an acrylate reactive diluent; and
(3) a photoinitiator.

Preferred reactive diluents are diacrylates of about 250 to about 1500 molecular weight. The preferred oligomer is the reaction product of about 20 to about 38 weight percent isocyanate, about 28 to about 60 weight percent acrylate and about 14 to about 38 weight percent polyol.

Preferably, the isocyanate moiety of the aromatic diisocyanate is not attached directly to the aromatic ring. The preferred diisocyanate is 1,1'-methylenebis(4-isocyanatocyclohexane).

DETAILED DESCRIPTION OF THE INVENTION

Ultraviolet (UV) cured no-wax coatings are commercially available based on the processes of U.S. Pat. Nos. 4,138,299 and 4,421,782. Oligomers based on 2-hydroxyethylacrylate, predominately aliphatic polyester polyol and 1,1'-methylenebis(4-isocyanatocyclohexane) are mixed with acrylate reactive diluents and photoinitiators and employed as no-wax wear surfaces for floor coverings. While these prior art compositions (particularly those containing substantial amounts of acrylic acid as reactive diluent) provided good no-wax performance, there were still some properties such as gloss retention, hydrolytic stability and stain resistance which could be improved. In addition, it was desirable to reduce or eliminate acrylic acid in the reactive diluent due to its volatility and corrosive properties. According to the practice of the present invention, it is possible to advance the state of the art to improve properties from good to excellent while lowering or eliminating acrylic acid.

Ultraviolet (UV) curable no-wax floor coatings, similar to Product B of U.S. Pat. No. 4,421,782, are used commercially. These contain oligomers which are the reaction products of 2-hydroxyethylacrylate, polyester polyols (based mainly on aliphatic acids) and 1,1'-methylenebis(4-isocyanatocyclohexane); and relatively low molecular weight acrylate reactive diluents. Substantial amounts of monoacrylates and/or acrylic acid have been used as reactive diluents, in part to reduce viscosities to workable levels. These wear layers are generally adhered to polyvinyl chloride composition substrates. While these prior art compositions provided good no-wax performance, there were still some properties such as gloss retention, hydrolytic stability and stain resistance which could be improved.

Although the wet-on-wet coating process of U.S. Pat. No. 4,421,782 is one way of upgrading these properties, it is somewhat cumbersome to perform in production and results in increased exposure to the volatile and corrosive acrylic acid. According to the practice of the present invention, it is possible to advance the state of the art to improve properties from good to excellent, while lowering the amount or even eliminating acrylic acid and still obtain desirably low coating viscosities, often lower than prior art formulations.

It was discovered that reacting 1,1'-methylenebis(4-isocyanatocyclohexane) [Mobay Chemical's Desmodur W] with a long chain monohydroxymonoacrylate and a phthalate polyester polyol could produce oligomers which would provide UV curable coatings of improved gloss retention, stain resistance and alkali resistance. Surprisingly, the viscosity of many of these coatings was lower than prior art formulas, even when little or no acrylic acid was used in the reactive diluent and wear appearance properties were superior.

A phthalate polyester polyol is defined as a polyester polyol of acid number less than about 15, preferably less than about 5, comprising the reaction product of an equivalent excess of one or more polyols of equivalent weight less than 150 with at least one polycarboxylic acid, wherein at least 50 equivalent percent of the polycarboxylic acid is terephthalic acid, isophthalic acid and/or phthalic acid or equivalent (e.g. phthalic anhydride or dimethyl terephthalate).

It was further discovered that oligomers, which are the reaction products of 0.7 to 1.5 equivalents of 1,1'-methylenebis(4-isocyanatocyclohexane) with 1.0 equivalent of a mixture of relatively high molecular weight (250 to 600) hydroxyacrylates and phthalate polyester polyols (equivalent ratio of hydroxyacrylate to polyester polyol greater than about 1.0) provide improved gloss retention, stain resistance and alkali resistance within a solventless UV curable coating of desirably low application viscosity. The coatings of the present invention comprise the above oligomers, acrylate reactive diluents and photoinitiators. Especially valuable properties are obtained when substantial quantites of high molecular weight (250 to 1500) diacrylates are the principle reactive diluents. Surprisingly, the viscosities of many of these preferred formulations are still lower than prior art formulations even when the excellent viscosity reducer acrylic acid is absent.

Diacrylate as used herein is an ester of acrylic acid and an alcohol, or a mixture of such esters, with an average of 1.5 to 2.5 acrylate groups per molecule. All molecular weights are number average molecular weights.

It is preferred to employ a polycaprolactone based hydroxyacrylate (e.g. Union Carbide's Tone M-100) and a predominately 1,6-hexylene phthalate polyester polyol in preparing the oligomer. A predominately 1,6-hexylene phthalate polyester polyol is defined as a phthalate polyester polyol wherein at least 50 equivalent percent of the <150 eq. wt. polyol is 1,6-hexanediol and wherein at least 50 eq. percent of the polycarboxylic acid is phthalic acid or equivalent (e.g. phthalic anhydride).

Tone M-100 (molecular weight 344) has an average skeletal structure of

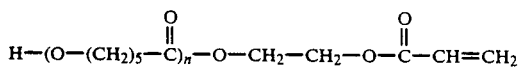

where n averages about 2.

Phthalate polyester polyols suitable for the present invention can be prepared by a procedure similar to Example 1 of U.S. Pat. No. 4,138,299 by reacting acids such as isophthalic, terephthalic, phthalic anhydride, adipic, azelaic and/or sebacic with polyols such as 1,6-hexanediol, trimethylol propane, triethylene glycol, neopentyl glycol, cyclohexane dimethanol and glycerine in the presence of a catalyst such as stannous oxalate.

The diisocyanate may be an aromatic or cycloalkyl diisocyanate such as 1,1'methylenebis(4-isocyanatocyclohexane), isophorone diisocyanate or tetramethyl xylene diisocyanate. The 1,1'-methylenebis(4-isocyanatocyclohexane) is commercially available as Desmodur ® W from Mobay Corporation.

Suitable acrylate reactive diluents include isodecyl acrylate, isobornyl acrylate, tetraethylene glycol diacrylate, hexanediol diacrylate and ethoxylated trimethylol propane triacrylate.

Preferred acrylate reactive diluents are diacrylates with molecular weights of about 250 to 1500. Examples of such are polybutanediol diacrylate, molecular weight of about 775 (Alcocur PBDDA from Alcolac Inc., Baltimore, Md.); ethoxylated bisphenol A diacrylates, molecular weight of 500 to 700 (SR-349, and Photomer 4028 and Photomer 4025 from Sartomer and Henkle, respectively); a diacrylate of a mixture of straight chain diols with 14 and 15 carbon atoms molecular weight of about 350 (SR-C2000, Sartomer); and acrylated hydroxy terminated polyesters.

Photoinitiators suitable for the practice of the invention include 2-hydroxy-2-methyl-1-phenyl-1-propane-1-one, benzyl dimethyl ketal, diethoxy acetophenone, 1-hydroxycyclohexylphenylketone, benzoin ethers and benzophenone. These can often advantageously be employed in combinations and/or in combination with photoactivators and photosensitizers. A preferred photoinitiator is benzophenone, which may be used in conjunction with other photoinitiators, photoactivators and/or photosensitizers. A preferred combination is about two parts benzophenone/part of 1-hydroxycyclohexylphenylketone.

Other components which may be useful include catalysts such as dialkyl tin dicarboxylates which aid in the preparation of the oligomer and will catalyze the reaction of any excess NCO with water. This can be allowed to occur in the film by the absorption of atmospheric moisture at ambient conditions or accelerated via elevated temperatures. Alternately, water can be added to the reaction vessel and the reaction of any excess NCO completed prior to UV curing. As would be obvious to one skilled in the art, plasticizers, dyes, pigments, light stabilizers, flow aids, etc. may also be employed for particular purposes.

The present invention has industrial applicability in the field of no-wax resilient floor surface coverings.

In the following examples, the wear layer samples were tested for gloss retention (steel wool rub), stain resistance (hair dye, shoe poish, ink, iodine) and alkali resistance (5% sodium hydroxide).

The following examples illustrate the practice of the invention.

Example 1

| A polyester polyol was prepared from the following ingredients | |
|---|---|
| Phthalic Anhydride | 20 equivalents |
| 1,6-Hexanediol | 23.8 equivalents |
| Glycerine | 6.0 equivalents |
| Dibutyltin bislauryl mercaptide catalyst | 0.1 weight % |

The ingredients were reacted at 220° C., under a nitrogen stream to a acid number less than one, producing a polyol with an hydroxyl eq. wt. of 315.

A coating composition was prepared as follows where the ingredients below in parts by weight were charged in order with stirring into a flask equipped with stirrer, condenser, heating mantle and gas inlet.

| | |
|---|---|
| 1. Isodecyl acrylate, reactive diluent | 25.0 parts |
| 2. Hexanediol diacrylate, reactive diluent | 5.5 parts |
| 3. Tone M-100, hydroxyacrlyate mol. wt. 344 from Union Carbide Corp. | 30.0 parts |
| 4. Polyester polyol (above) | 17.5 parts |
| 5. Dibutyltin dilaurate, catalyst | 0.2 parts |
| 6. Ionol ®, polymerization inhibitor (Shell) | 0.02 parts |
| 7. Desmodur ® W, diisocyanate (Mobay Corp.) | 19.0 parts |

The mixture was heated, with stirring and under a trickle of dry air, to 70° C. and held at 70° C. for four hours to react the NCO groups of ingredient 7 with the hydroxy groups of ingredients 3 and 4 to form the oligomer. Upon cooling to about 45° C., a solution of the following ingredients were charged with stirring:

| | |
|---|---|
| 8. Acrylic acid, reactive diluent | 3.0 parts |
| 9. Benzophenone, photoinitiator | 1.8 parts |
| 10. Irgacure 651, photoinitiator (Ciba-Geigy) | 0.9 parts |
| 11. DC-193, leveling aid (Dow Chemical) | 0.1 parts |

This formula had 66.5% oligomer and 33.5% reactive diluents. The oligomer had an NCO/OH ratio of 1.01 and a hydroxy acrylate/polyol ratio of 1.56. The oligomer composition was 26.3% polyester, 45.1% Tone M-100 and 28.6% Desmodur W. The 3% acrylic acid in the total formulation made up 9% of the reactive diluents.

The composition was coated on plate glass using a 3 mil Bird blade and UV cured via 2 passes under a pair of 200-watt-per-inch medium pressure mercury lamps at a belt speed which resulted in the delivery of 2.5 joules/sq. cm. per pass.

A comparative composition, Composition 1, was prepared which was similar in composition to Product B of U.S. Pat. No. 4,421,782. This comparison formulation is also very similar in composition and properties (e.g. stain resistance and gloss retention), to a commerical no-wax coating. It was similarly applied to and cured on plate glass. Table I contains comparitive results, where +=satisfactory, ++=good, +++=very good, and ++++=excellent.

TABLE I

|  | Comparative 1 | Example 1 |
|---|---|---|
| Room Temperature Viscosity (CPS) | 10,000 | 2,700 |
| Stain Resistance | + | ++ |
| Gloss Retention | + | +++ |

Not only were properties significantly improved, but viscosity was reduced by a third. Example 1 was scaled up to pilot plant size and curtain coated onto polyvinyl chloride based floor tiles, UV cured and put through a number of tests for suitability as a flooring wear layer. These tests confirmed the very good gloss retention under actual foot traffic and the good household stain resistance. These tests also confirmed the general suitability of this formula for flooring wear layers (e.g. adequate heat and light stability, ease of cleaning, etc.)

Example 2

The series of formulations in Table II was prepared and tested as in Example 1. All of the formulations except B and C were prepared using the same catalysts, inhibitor and procedure as in Example 1. B and C were made similarly except they were reacted for one hour at 70° C. prior to adding the water, then for six hours after the water was added.

Comparative results can be found at the bottom of Table II. The results show that a wide range of acrylate reactive diluents can be used within the practice of the invention, either with or without acrylic acid. It is also apparent that high molecular weight diacrylates are preferred.

TABLE II

|  | Comparative 1 | A | B | C | D | E | F | G |
|---|---|---|---|---|---|---|---|---|
| Polyester Polyol Reactants (In Equivalents) | | | | | | | | |
| Phthalic anhydride | | 20.0 | 20.0 | — | 20.0 | 20.0 | 20.0 | 20.0 |
| Isophthalic Acid | | — | — | 20.0 | — | — | — | — |
| 1,6-Hexanediol | | 27.5 | 23.8 | — | 29.7 | 29.7 | 29.2 | 33.0 |
| SR-100 Diol, Sartomer | | — | — | 15.5 | — | — | — | — |
| Cyclohexane dimethanol | | — | — | 9.70 | — | — | — | — |
| Glycerine | | 2.30 | 6.00 | 12.5 | 2.30 | 2.30 | 0.30 | — |
| Polyol Hydroxyl Eq. Wt. | | 317 | 315 | 300 | 278 | 278 | 300 | 260 |
| Oligomer Reactants (Weight % in Oligomer) | | | | | | | | |
| Polyester polyol | 52.8 | 26.3 | 30.6 | 26.8 | 29.0 | 18.9 | 29.4 | 18.4 |
| Tone M-100 | | 45.1 | 38.7 | 42.3 | 41.6 | 52.8 | 43.1 | 50.6 |
| Desmodur W | | 28.6 | 30.6 | 30.9 | 24.4 | 28.3 | 27.5 | 31.0 |
| Water[1] | | — | 1.04 | 1.04 | — | — | — | — |
| Oligomer Equivalent Ratios | | | | | | | | |
| NCO/OH | | 1.01 | 1.11 | 1.11 | 1.00 | 0.976 | 0.994 | 1.09 |
| Hydroxyacrylate/Polyol | .67 | 1.50 | 1.17 | 1.16 | 1.16 | 2.33 | 1.42 | 2.08 |
| Reactive Diluents (Weight % of Total Reactive Diluent) | | | | | | | | |
| Hexanediol diacrylate | | 20.9 | 18.4 | 16.4 | — | — | — | — |
| Isodecyl Acrylate | | 47.8 | 69.7 | 75.8 | — | 6.40 | — | — |
| Isobornyl Acrylate | | 31.3 | — | — | — | — | — | — |
| Acrylic Acid | 23.2 | — | 11.8 | 7.80 | — | — | — | — |
| SR-349[2] | | — | — | — | 50.0 | — | — | — |
| Reactive Diluents (Weight % of Total Reactive Diluent) | | | | | | | | |
| Alcocur PBDDA[3] | | — | — | — | 50.0 | — | — | — |
| Photomer 4028[4] | | — | — | — | — | 70.2 | — | — |
| Chemlink 2000[5] | | — | — | — | — | 23.4 | 26.5 | — |
| Photomer 4025[6] | | — | — | — | — | — | 73.5 | — |
| Polyester Diacrylate[7] | | — | — | — | — | — | — | 100 |
| Oligomer in Complete Formula (Except for Photoinitiators) (Wt. %) | 69.8 | 66.5 | 62.0 | 61.5 | 50.0 | 53.0 | 51.0 | 49.0 |
| Reactive Diluents in Complete Formula (Except for Photoinitiators) (Wt. %) | 30.2 | 33.5 | 38.0 | 38.5 | 50.0 | 47.0 | 49.0 | 51.0 |
| Photoinitiators (PHR) | | | | | | | | |
| Benzophenone | | 1.80 | 2.00 | 2.00 | 1.80 | 1.80 | 1.80 | 1.80 |
| Irgacure 184 | | 0.90 | — | — | 0.90 | 0.90 | 0.90 | 0.90 |
| Irgacure 651 | | — | 0.90 | 0.90 | — | — | — | — |
| Properties versus Comparative Formula | | | | | | | | |
| RT VISC (CPS) | 10000 | 3,600 | 3,200 | 3,200 | 9,000 | 4,600 | 5,400 | 15,000 |
| Stain Resistance | + | ++ | ++ | ++ | +++ | +++ | +++ | +++ |
| Gloss Retention | + | +++ | ++ | ++ | +++ | +++ | ++++ | +++ |

TABLE II-continued

|  | Comparative 1 | A | B | C | D | E | F | G |
|---|---|---|---|---|---|---|---|---|
| Alkali Resistance | + | +++ | ++ | ++ | +++ | +++ | +++ | +++ |

[1] Parts added/100 parts of other oligomer ingrs. (not all of the water reacts)
[2] Sartomer's ethoxylated Bisphenol A diacrylate (MW approximately 510)
[3] Alcolac's polybutanediol diacrylate (mol. wt. approximately 775)
[4] Henkle's ethoxylated Bisphenol A diacrylate (MW approximately 540)
[5] Sartomer's long straight chain aliphatic diacrylate (MW approximately 350)
[6] Henkle's ethoxylated Bisphenol A diacrylate (MW approximately 690)
[7] Acrylated 1,6-hexylene phthalate (MW approximately 625)

What is claimed is:

1. A floor covering product comprising a wear layer including a polymerized urethane-acrylate oligomer, said oligomer comprising the reaction product of an aromatic or cycloalkyl diisocyanate, a monohydroxymonoacrylate having an hydroxyl equivalent weight of about 250 to about 600 and a phthalate polyester polyol having an hydroxyl equivalent weight of about 175 to about 500.

2. The floor covering product of claim 1 wherein the number of equivalents of isocyanate functionalities to equivalents of hydroxyl functionalities is about 0.7 to about 1.5, and the number of equivalents of hydroxyacrylate functionalities to equivalents of polyester polyol functionalities is greater than about 1.0.

3. The floor covering product of claim 1 wherein the aliphatic diisocyanate is selected from the group consisting of 1,1'-methylenebis(4-isocyanatocyclohexane), isophorone diisocyanate and tetramethyl xylene diisocyanate.

4. The floor covering product of claim 2 wherein the monohydroxymonoacrylate has the following structure:

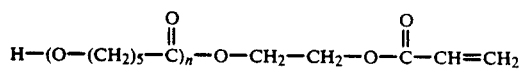

where n has a value of at least 1 and no greater than about 4.

5. The floor covering product of claim 4 wherein the phthalate polyester polyol is a predominately 1,6-hexylene o-phthalate polyester polyol.

6. The floor covering product of claim 1 wherein the wear layer comprises the reaction product of the urethane-acrylate oligomer, an acrylate reactive diluent and a photoinitiator.

7. The floor covering product of claim 6 wherein the wear layer comprises the reaction product of about 40 to about 70 percent by weight of the urethane-acrylate oligomer, about 30 to about 60 percent by weight of the acrylate reactive diluent and about 0.01 to about 25 parts per 100 parts of oligomer and diluent of the photoinitiator.

8. The floor covering product of claim 7 wherein the acrylate reactive diluent comprises at least 55% by weight of a diacrylate having a molecular weight of about 250 to about 1500.

9. The floor covering product of claim 2 wherein the wear layer comprises the reaction produt of the urethane-acrylate oligomer, an acrylate reactive diluent and a photoinitiator.

10. The floor covering product of claim 9 wherein the wear layer comprises the reaction product of about 40 to about 70 percent by weight of the urethane-acrylate oligomer, about 30 to about 60 percent by weight of the acrylate reactive diluent and about 0.01 to about 25 parts per 100 parts of oligomer and diluent of the photoinitiator.

11. The floor covering product of claim 10 wherein the acrylate reactive diluent comprises at least 55% by weight of a diacrylate having a molecular weight of about 250 to about 1500.

12. The floor covering product of claim 4 wherein the wear layer comprises the reaction product of the urethane-acrylate oligomer, an acrylate reactive diluent and a photoinitiator.

13. The floor covering product of claim 12 wherein the wear layer comprises the reaction product of about 40 to about 70 percent by weight of the urethane-acrylate oligomer, about 30 to about 60 percent by weight of the acrylate reactive diluent and about 0.01 to about 25 parts per 100 parts of oligomer and diluent of the photoinitiator.

14. The floor covering product of claim 13 wherein the acrylate reactive diluent comprises at least 55% by weight of a diacrylate having a molecular weight of about 250 to about 1500.

15. The floor covering product of claim 5 wherein the wear layer comprises the reaction product of the urethane-acrylate oligomer, an acrylate reactive diluent and a photoinitiator.

16. The floor covering product of claim 15 wherein the polyester polyol comprises the reaction product of phthalic anhydride and 1,6-hexanediol.

17. The floor covering product of claim 15 wherein the wear layer comprises the reaction product of about 40 to about 70 percent by weight of the urethane-acrylate oligomer, about 30 to about 60 percent by weight of the acrylate reactive diluent and about 0.01 to about 25 parts per 100 parts of oligomer and diluent of the photoinitiator.

18. The floor covering product of claim 17 wherein the polyester polyol comprises the reaction product of phthalic anhydride and 1,6-hexanediol.

19. The floor covering product of claim 17 wherein the acrylate reactive diluent comprises at least 55% by weight of a diacrylate having a molecular weight of about 250 to about 1500.

20. The floor covering product of claim 19 wherein the diacrylate is selected from the group consisting of a diacrylate ester of ethoxylated bisphenol A, a diacrylated linear aliphatic diol of average chain length of about 14 carbon atoms and mixtures thereof.

* * * * *